Oct. 19, 1926.
S. CAHILL, JR
1,603,580
METER SEALING MEANS
Original Filed March 13, 1924
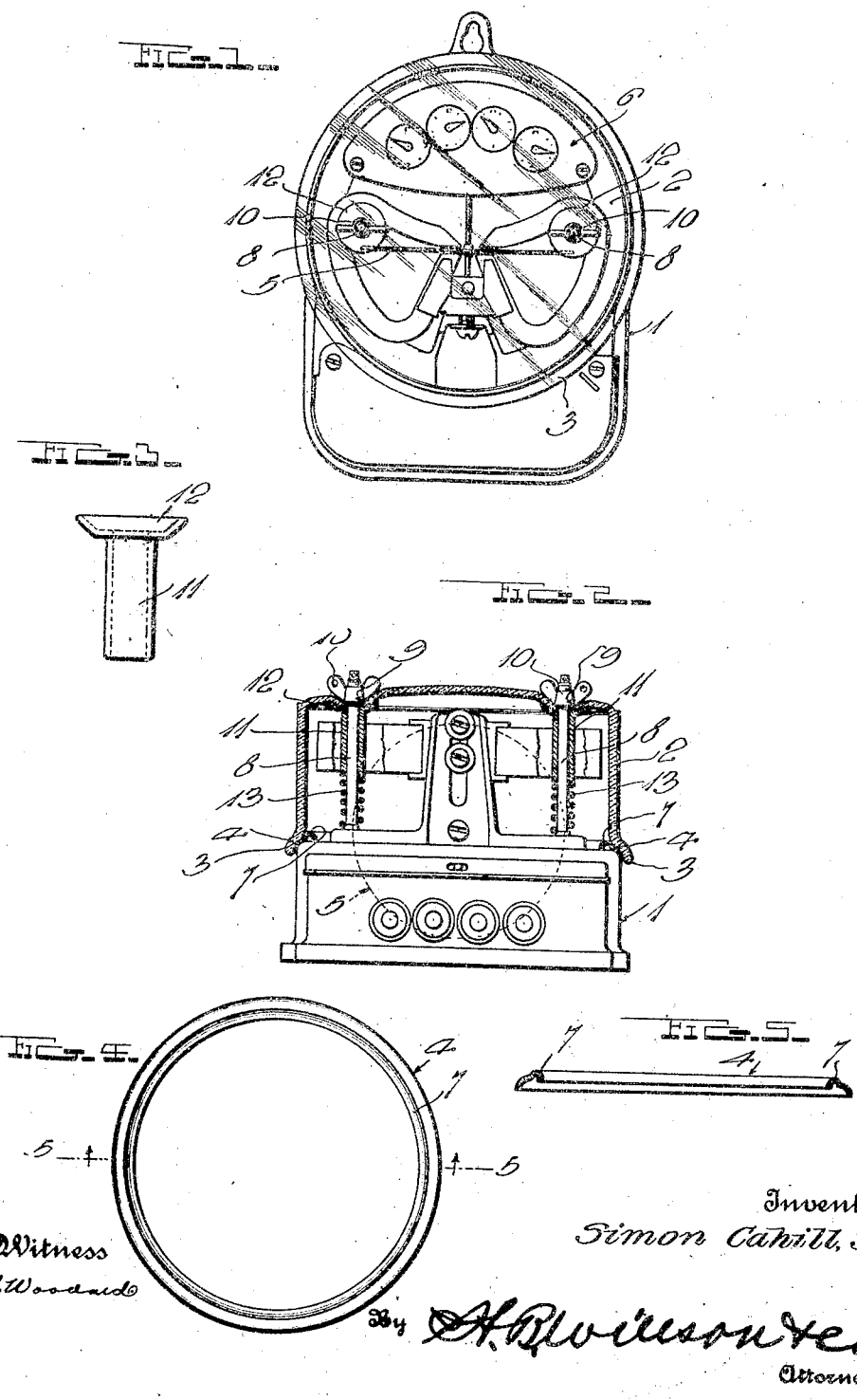
Inventor
Simon Cahill, Jr.
Witness
H. Woodard
By H. R. Willson & Co
Attorneys Patented Oct. 19, 1926.

UNITED STATES PATENT OFFICE

SIMON CAHILL, JR., OF NEW ORLEANS, LOUISIANA.

METER-SEALING MEANS.

Application filed March 13, 1924, Serial No. 699,032. Renewed July 6, 1926.

My invention relates to improvements in meters and relates more particularly to electrical meters having housings provided with removable sections abutting relatively stationary sections, said removable sections being usually formed of glass and extending over the recording mechanism of the meter as well as the rotatable disk which revolves with the operating mechanism of the recorder. The removable housing sections are usually secured in place by bolts projecting through bolt holes therein, from the stationary housing sections, and in a number of cases, consumers have been known to loosen the nuts of the bolts sufficiently to permit a wire or other small instrument to be inserted through the bolt hole for the purpose of holding the rotary disk against rotation and consequently throwing the recording means out of play. Also, consumers have been known to insert wires or the like between the removable housing sections and the stationary sections for the same purpose. It is the object of my invention however, to overcome these difficulties in an exceptionally simple and inexpensive manner, which will not necessitate any changes in the meter construction.

With the foregoing in view, the invention resides in the novel subject matter hereinafter described and claimed, the description being supplemented by the accompanying drawing.

Figure 1 is a front elevation of a meter improved in accordance with my invention.

Figure 2 is a lower end elevation, partly in section.

Figure 3 is a side elevation of one of the sealing sleeves which surround the connecting bolts between the relatively stationary and removable housing sections.

Figure 4 is a plan view of a sealing ring which is interposed between the two housing sections.

Figure 5 is a sectional view of the sealing ring as indicated by line 5—5 of Fig. 4.

In the drawing above briefly described, I have illustrated a well known form of meter having a housing which includes a relatively stationary section 1 and a removable section 2 abutting the front side of said section 1 and in most instances formed of glass. The inner edge of the removable section 2 is formed with a flared flange 3 which encompasses a portion of the housing section 1 and a ring of felt is usually interposed between the two housing sections, along their line of contact. These felt rings however, are often picked away or cut sufficiently to permit a wire or other small instrument to be inserted for the purpose of stopping the rotating disk 5 of the meter and throwing the recording means 6 thereof out of play. For this soft ring of felt or the like, I substitute a ring 4 of steel or other desired hard material, said ring being preferably, although not necessarily stamped into shape. In all instances, I provide the outer side of the ring 4 with a rib 7 for disposition at the inner side of the wall of the removable housing section 2, and it will thus be seen that it is impossible to insert an instrument between the two sections of the housing.

Extending from the stationary section 1 of the meter housing, I have shown a pair of bolts 8 which pass through bolt holes 9 in the front side of the removable housing section 2, nuts 10 being threaded upon the outer ends of these bolts. Even though these nuts are usually held by a wire seal, so that they cannot be removed, they can often be loosened sufficiently to permit a wire or some small instrument to be passed through some one or the other of the openings 9, so as to throw the meter out of operation. To overcome this difficulty, I provide sealing members for the openings 9, said members being preferably in the form of elongated sleeves 11 which surround the bolts 8 and have their outer ends in tight contact with the front portions of the housing section 2, said front ends of the sleeves being preferably provided with integral, outstanding, annular flanges 12 shaped to tightly contact with the removable housing section as shown.

The sleeves 11 may be secured in place in any desired manner but I prefer to provide coiled compression springs 13 surrounding the bolts 8 and bearing against the inner ends of said sleeves, as illustrated in Fig. 2. These springs are sufficiently strong to prevent any instrument, small enough to be passed through one of the bolt holes 9, at the side of the bolt, from forcing the sleeves 11 inwardly, and thus tampering with the internal parts of the meter, is prevented.

It will be seen from the foregoing that simple and inexpensive provision has been made for so improving upon meters of well known forms, as to prevent the theft of current, by throwing such meters out of operation. As excellent results may be obtained from the details disclosed, they may well be followed but within the scope of the invention as claimed, numerous minor changes may be made.

I claim:

1. In combination with a meter having a stationary housing section, a removable housing section, and a bolt extending from the stationary section through an opening in the removable section for holding the latter in place; a sealing member for said opening surrounding said bolt and bearing against the inner side of said removable section, and a hard sealing ring interposed between the two housing sections, said sealing member and sealing ring preventing the insertion of a wire or instrument to throw the meter out of play.

2. In combination with a meter having a stationary housing section, a removable housing section, and a bolt extending from the stationary section through an opening in the removable section for holding the latter in place; a sealing member for said opening surrounding said bolt and bearing against the inner side of said removable section, said sealing member preventing the insertion of a wire or instrument to throw the meter out of play.

3. A structure as specified in claim 2; said sealing member comprising a sleeve having an annular outstanding flange contacting with the inner side of said removable housing section.

4. A structure as specified in claim 2; together with a spring surrounding said bolt and holding said sealing member tightly in contact with the inner side of said removable housing section.

5. In combination with a meter having a stationary housing section, a removable housing section; and a bolt extending from the stationary section through an opening in the removable section for holding the latter in place; a sealing sleeve for said opening surrounding said bolt and having an annular outstanding flange bearing against the inner side of said removable section, said sealing member preventing the insertion of a wire or instrument to throw the meter out of play, and a spring surrounding said bolt and holding said sleeve in operative position.

In testimony whereof I have hereunto affixed my signature.

SIMON CAHILL, Jr.